United States Patent [19]

Rance et al.

[11] Patent Number: 5,124,422
[45] Date of Patent: Jun. 23, 1992

[54] ADHESIVE POLYMER

[75] Inventors: Robert W. Rance, Bühl, Fed. Rep. of Germany; Etienne R. D. A. Lazarus, Haguenau, France

[73] Assignee: The Dow Chemical Company, Midland, Mich.

[21] Appl. No.: 208,957

[22] Filed: Jun. 17, 1988

[30] Foreign Application Priority Data

Jun. 26, 1987 [DE] Fed. Rep. of Germany ....... 3721096

[51] Int. Cl.$^5$ .............................................. C08F 20/26
[52] U.S. Cl. ............................ 526/318.2; 526/318.25; 526/318.42; 526/931
[58] Field of Search ........... 526/318.25, 318.2, 318.42, 526/931

[56] References Cited

U.S. PATENT DOCUMENTS

| | | | |
|---|---|---|---|
| 4,445,959 | 9/1984 | Hombach et al. | 524/750 |
| 4,540,739 | 9/1985 | Midgley | 524/764 |

FOREIGN PATENT DOCUMENTS

| | | |
|---|---|---|
| 22967 | 5/1981 | European Pat. Off. |
| 48950 | 9/1982 | European Pat. Off. |
| 62343 | 10/1982 | European Pat. Off. |
| 126000 | 2/1984 | Japan. |
| 47212 | 3/1984 | Japan. |
| 141775 | 6/1986 | Japan. |
| 1076231 | 1/1967 | United Kingdom. |
| 1174914 | 7/1969 | United Kingdom. |

OTHER PUBLICATIONS

Kirk–Othmer, Encyclopedia of Chemical Technology, Third Ed., 1, New York, John Wiley & Sons, pp. 490 and 491 (1978).

Dhal, et al., Pressure Sensitive Adhesives of Acrylic Polymers Containing Functional Monomers, 23 Polymer 932-9 (Jun. 1982).

Primary Examiner—Joseph L. Schofer
Assistant Examiner—J. T. Smith

[57] ABSTRACT

Improved adhesive polymers based on monovinylidene aromatic and conjugated diene monomers (e.g. styrene and butadiene) are prepared using a hydroxyalkyl (meth)acrylate monomer and itaconic acid to provide improved combinations of shear strength and tack. Itaconic acid is used in the range of 0.5 to 5 percent by weight and the hydroxyalkyl (meth)acrylate in the range of 1.5 to 17 weight percent. Hydroxyethyl acrylate is a preferred hydroxyalkyl (meth)acrylate compound.

8 Claims, No Drawings

ADHESIVE POLYMER

BACKGROUND OF THE INVENTION

The present invention relates to improved polymer compositions which are particularly suitable for use as pressure sensitive adhesives. By the use of a combination of hydroxyalkyl (meth)acrylate and itaconic acid monomers in polymers containing primarily monovinylidene aromatic and conjugated diene monomers, surprising combinations of adhesion and shear strength are obtained.

As used in the art, the term "pressure sensitive adhesives" designates a polymeric material which, when dried, is aggressively and permanently tacky at room temperature. A typical pressure sensitive adhesive will firmly adhere to a variety of dissimilar surfaces upon mere contact without the need of more than finger- or hand-applied pressure. The most important properties recognized by the pressure sensitive adhesive industry are the adhesion ("tack") and resistance to shear of these polymer compositions. Attempts to improve the tack properties of a pressure sensitive adhesive, such as by the addition of a tackifier, unfortunately tend to reduce the resistance to shear and promote shear failure.

Recent efforts to optimize pressure sensitive adhesive properties have focused on the use of acrylate-type latex polymers and the use of minor amounts of hydrophylic monomers therein. In EP 48950 latex polymers based on acrylate and diene monomers are modified with minor amounts of an unsaturated acid to improve their pressure sensitive adhesive properties. In Japanese Patent 59-47,212 similar acrylate-diene polymers are taught which attempt to replace the major part of the acid with a hydroxyalkyl acrylate monomer. Japanese Patent publication 61-141,775 (1986) discloses the use of specific oligomeric emulsifier compounds with pressure sensitive adhesive latex polymers based on styrene and butadiene and further containing optionally methyl methacrylate, itaconic acid and hydroxyethyl acrylate. However, it has been found that (meth)acrylate-containing polymers can possess an undesirable odor and there is always an interest in finding adhesive polymers with improved physical property combinations.

Efforts to improve the properties of monovinylidene aromatic-conjugated diene adhesive polymers have involved the use of acid, (meth)acrylate and/or (meth)acrylonitrile monomers. See for example U.S. Pat. Nos. 4,540,739 and 4,445,959 and E.P. 22 967. In efforts to prepare pressure sensitive adhesives from these non-acrylate polymers, however, it has been found to be difficult to obtain good combinations of tack and shear resistance.

SUMMARY OF THE INVENTION

According to the present invention there is provided an improved, non-acrylate pressure sensitive polymer. This improved pressure sensitive adhesive composition is a polymer of: (a) 1 to 50 parts by weight of at least one monovinylidene aromatic monomer and (b) 50 to 99 parts by weight of at least one conjugated diene monomer on the basis of 100 weight parts (a) and (b), characterized by comprising polymerized therein based on the total amount of adhesive polymer, (c) 0.5 to 5 percent by weight itaconic acid and (d) 1.5 to 17 percent by weight of at least one hydroxyalkyl (meth)acrylate. These polymer compositions are found to provide excellent pressure sensitive adhesive properties including good combinations of tack and resistance to shear.

DETAILED DESCRIPTION OF THE INVENTION

The bulk of the polymeric material is prepared from monovinylidene aromatic and conjugated diene monomers. Conjugated diene monomers are generally well known for the preparation of latex polymers and are represented by the formula:

$$CH_2=C(R_1)-C(R_2)=C(R_3)-R_4 \quad \text{I}$$

wherein $R_1$, $R_2$, $R_3$ and $R_4$ are independently —H, halogen, or 1- to 20-carbon hydrocarbon radicals. Preferably $R_1$ is a —H, chloro or methyl radical and $R_2$, $R_3$ and $R_4$ are —H (i.e., the conjugated diene is butadiene, isoprene or chloroprene). Most preferably, butadiene is used as the conjugated diene.

Monovinylidene aromatic monomers are well known in the art and commonly used in preparing latex polymers. These monomers are generally represented by the formula:

$$Ar-C(R_5)=CH_2 \quad \text{II}$$

wherein Ar is phenyl or phenyl substituted with halogen and/or substituted with one or more hydrocarbon radical(s) having 1 to 4 carbon atoms and $R_5$ is —H or a 1- to 4-carbon alkyl group. Preferred examples of such monomers include alpha methyl styrene and one or more of the vinyl toluene isomers, with styrene being the most preferred monovinylidene aromatic monomer.

The actual amounts of the conjugated diene and the monovinylidene aromatic monomers used to prepare the latex polymer will depend upon the specific application intended for the pressure sensitive adhesive material. In general, the relative amounts are chosen to achieve a relatively soft (low $T_g$) polymer. Based on 100 weight parts of the monovinylidene aromatic and diene monomers, the monovinylidene aromatic monomer typically constitutes from 1 to 50 weight parts, preferably from 10 to 50 weight parts, more preferably from 20 to 50 weight parts and most preferably 30 to 40 weight parts. The balance of the 100 weight parts is the conjugated diene monomer. In general, however, the types and relative amounts of these two components are selected to provide the desired basic polymer property combinations (adhesion and shear strength). The monomer combination according to the present invention can then be seen to provide surprising improvements in these property combinations.

One of the critical monomers which is employed to prepare the polymers according to the present invention is a hydroxyalkyl (meth)acrylate. These monomers and their use in pressure sensitive adhesive compositions are generally known in the art (for lower levels and in certain monomer combinations). See, for example, GB Patent 1 174 914 and Japanese Patent Publications 61-141,775 and 59-47,212. As used herein the term hydroxyalkyl (meth)acrylate refers to a hydroxy ester of acrylic or methacrylic acid represented by the following formula:

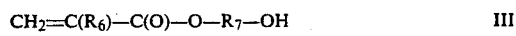

$$CH_2=C(R_6)-C(O)-O-R_7-OH \quad \text{III}$$

wherein $R_6$ is —H or methyl radical and $R_7$ is a straight or branched chain hydrocarbon radical having 1 to 10 carbon atoms. Preferably $R^7$ is a methyl, ethyl, or propyl radical. The preferred hydroxyalkyl (meth)acrylate is hydroxyethyl acrylate. The hydroxyalkyl (meth)acrylate can beneficially be used in amounts of from 1.5 to 17 percent by weight based upon the total weight of the adhesive polymer. Generally 2 to 17 percent by weight hydroxyalkyl (meth)acrylate is used, with amounts in the range of 3 to 15 percent by weight being preferable, amounts in the range of 4 to 10 percent by weight being more preferable and amounts in the range of 4 to 7 percent by weight being most preferred.

Achieving optimized pressure sensitive adhesive properties in the monovinylidene aromatic/conjugated diene based polymers has also been found to hinge upon the use of itaconic acid in addition to the hydroxyalkyl (meth)acrylate. Itaconic acid is generally known in the art as a comonomer suitable for use in latex polymer compositions. It has been found to be critical in the present compositions to use itaconic acid amounts in the range of 0.5 to 5 percent by weight based upon the pressure sensitive adhesive polymer composition. Preferably, amounts in the range of 0.5 to 4 percent by weight should be used, more preferably in the range of 0.5 to 3 and most preferably in the range of 1 to 3.

While prior art generally teaches the use of unsaturated carboxylic acids in latex polymer compositions, the commonly used polymerizable acids (methacrylic acid, acrylic acid and fumaric acid) are found not to provide similar benefits in these compositions. It is completely unexpected and surprising that the benefits in shear strength would be obtained while maintaining a good level of tack only when using itaconic acid at the specified levels.

In aspects other than the composition, the pressure sensitive adhesive polymer compositions according to the present invention are prepared using conventional emulsion polymerization techniques. For example, the polymers can be prepared in a batch reaction, continuous reaction, or a batch reaction with one or more continuously added monomer streams. While not critical, the particle size of the latex can be selected to provide optimized adhesion and shear strength properties according to the teachings of U.S. Pat. No. 4,419,481, which is incorporated by reference herein. Upon completion of the latex polymerization process, usually at a solids level of about 40 to 60 percent, the latex is desirably steam distilled to remove unreacted monomer and treated as necessary with acid or base to adjust the pH. There is typically nearly 100% conversion of the monomers to polymer resulting in a polymer composition identical to the composition of the supplied monomers.

Insofar as the desired pressure sensitive adhesive properties are maintained, various optional ingredients can be used in these compositions. For example, monomers such as vinyl and/or vinylidene chloride can be incorporated. In order to retain the advantages of a monovinylidene aromatic-conjugated diene polymer and avoid the odor and any other undesired effects of (meth)acrylate polymers the level of any (meth)acrylate monomer should be minimized, and preferably kept below 3, more preferably 1, weight percent of the total polymer composition and most preferably completely avoided.

As well known regarding the preparation of latexes and pressure sensitive adhesives, other ingredients such as anti-foaming agents, wetting agents, thickeners, plasticizers, fillers, pigments, antioxidants and metal chelating agents may be used. Known anti-foaming agents include silicon oils and acetylene glycols. Typical plasticizers include mineral oil, liquid polybutenes, liquid polyacrylates and lanoline. Zinc oxide, titanium dioxide, aluminum hydrate, calcium carbonate, and clay are typically employed fillers.

Tackifiers which increase the adhesion of the compositions in general or for specific surfaces may also be added. Suitable tackifiers include polyterpene resins, gum rosin, rosin esters and other rosin derivatives, oil-soluble phenolic resins, coumaroneindene resins and petroleum hydrocarbon resins. The tackifier can either be added during or before the polymerization process or blended in afterwards. When used, amounts of at least 5 weight percent based on the weight of tackifier plus base adhesive polymer are typical, preferably at least 10 weight percent and most preferably at least 15 weight percent. Normally the levels do not exceed 70 weight percent with levels of 50 weight percent or less preferred.

The compositions of the present invention may be used as the adhesive component in pressure sensitive tapes, labels, films and foams. They adhere well to polymer surfaces such as plasticized poly(vinylchloride), Mylar brand polyester film, cellulose acetate, nylon, polyethylene and polypropylene as well as to paper, metal and painted surfaces. They are especially useful in the adhesive components of labels, tapes, decorative vinyl sheets, decals, and vinyl foams and tiles.

Known coating processes including roller coaters, blade coaters, Meyer rods or air coaters can be used to prepare such articles of manufacture with the pressure sensitive adhesive compositions of the present invention. The resin may be coated directly to the article which then may or may not have a conventional release paper for temporary protection. Alternatively, the adhesive may be coated onto a release paper and then transferred to the second surface which is desired to be coated by passing both the release paper and the second surface together through rolls.

The coated substrate is dried, usually by passing it through a heating tunnel or oven which may use circulating hot air or infrared lamps to dry the coated substrate. The drying time will be a function of a number of factors such as the heat capacity of the substrate, the type of heating, the oven temperature, air velocities (if circulating air is used) and the rate of passage of the substrate through the oven or heating tunnel. One skilled in the art may readily determine suitable time/temperature relationships to determine optimum drying conditions in particular equipment for the product.

The present invention will be further illustrated by the following experiments. Unless otherwise specified, all amounts are in parts by weight and temperatures in degrees Celsius.

EXAMPLE

To prepare the sample compositions described and evaluated in the following Tables, the amounts of monomers indicated in the Table were fed continuously to a heated, agitated latex polymerization reactor which had been purged with nitrogen. As the initial charge, the reactor was supplied with distilled water, Dowfax ® 2A1 brand alkylated diphenyl oxide disulphonate surfactant (0.05 parts by weight), Versenol ® 120 brand chelating agent (0.02 parts by weight), and a styrene polymer seed latex, 0.8 weight parts of seed latex solids to produce a particle size of 0.16 micrometers or 3.1 weight parts of seed latex solids where a particle size of 0.11 micrometer was produced (Versenol and Dowfax are registered trademarks of The Dow Chemical Company). Upon heating the initial charge to a temperature of 90° C. the aqueous and monomer feeds were supplied. The monomer feeds are indicated in the Tables and were supplied over a period of 375 minutes. The aqueous feed contained sodium persulfate initiator (0.7 parts by weight), Dowfax 2A1 brand alkylated diphenyl oxide disulphonate surfactant (0.50 parts by weight) and sodium hydroxide (0.15 parts by weight) and was continuously supplied for 385 minutes. For convenience the hydroxyalkyl (meth)acrylate (if used) was fed continuously as a separate stream. Where a polymerizable carboxylic acid was used, its location was varied according to its solubility. Itaconic acid was fed as a separate aqueous feed for 315 minutes (Experiments 1, 3 and 13) or was added to the reactor charge (Experiments 4, 5, 7, 8, 14, 15 and 16). In Experiment 9, three parts itaconic acid were added to the reactor charge and 2 parts fed in an aqueous stream due to the limited water solubility of the acid. Acrylic and methacrylic acids were added to the main monomer feed. Fumaric acid was added to the initial reactor charge. Chain transfer agents were used as shown in the tables, being added to the main monomer feed.

During the polymerization reaction the temperature was maintained at 90° C. and there was a 60 minute cook-down after the feeds were completed, also at 90° C.

At completion there was a solids level of about 50 percent by weight. The remaining minor amounts of unpolymerized monomer were devolatilized and the pH was adjusted to about 6. Since there was essentially complete conversion of the monomer, the polymer composition is identical to the compositions of the monomer feeds supplied. The average particle sizes of these latexes were 0.16 and 0.11 micrometer (depending on the amounts of seed latex used) as measured by light scattering.

To prepare a pressure sensitive adhesive coating, these sample adhesive resins were blended with Triton X-100 brand octylphenol ethoxylate wetting agent (1 part by weight), Acrylon A300 brand polyacrylate thickener (0.125 parts by weight) and Snowtack 42CF brand resin based tackifier and coated onto release paper to give a dry coating weight of about 20 grams per square meter (g/m$^2$) using a wire wound rod. The adhesive layer was then dried and transferred to a face stock paper sheet by passing between two nip rollers. Shear adhesion was measured by fixing an area 3.23 square centimeters (cm$^2$) to a steel plate and measuring the time in minutes (min) for the sample to be removed at an angle of 2 degrees by a weight of 1000 grams (g) being attached thereto. The tack of the samples was measured by the Rolling Ball method. In this method, a section of the adhesive coated sheet 20 centimeters in length was placed on a flat surface with the adhesive side facing up. A 1.1 centimeter diameter steel ball was rolled onto the adhesive layer from an 8 centimeter long, V-shaped channel inclined at an angle of 30 degrees. The distance the ball traveled before stopping is given in centimeters and was a measure of tack, the shorter distances indicating greater tack. If the tack was insufficient the ball rolled completely off the coated sheet (>20 cm).

In the following Tables these abbreviations are used: hydroxyalkyl (meth)acrylate is HA(M)A, butadiene is But, styrene is Sty, itaconic acid is IA, acrylic acid is AA, methacrylic acid is MAA, fumaric acid is FA, chain transfer agent is CTA, carbon tetrachloride is CCl$_4$, tertiarydodecyl mercaptan is t-DDM, hydroxyethyl acrylate is HEA, hydroxypropyl acrylate is HPA and hydroxyethyl methacrylate is HEMA.

As can be seen comparing Composition number 3 with Compositions number 1* and 2*, the combined effect of the hydroxyalkyl (meth)acrylate and itaconic acid monomers is to maintain the tack properties of the adhesive composition but to provide a dramatic improvement in the shear strength of the polymer.

As can be seen in Table 2, below, itaconic levels in the range of 0.5 to 5 provide improved shear strength in the adhesive polymers, with amounts in the range of 0.5 to 2 being the most improved. Table 3 shows the criticality of using itaconic acid as compared to other polymerizable acid monomers While several compositions in the Tables exhibit adhesive failure in the shear strength test, the excellent inherent shear strength of the polymer is of major importance. This reduced adhesive shear strength (tack) can be somewhat rectified by the use of tackifier in some applications and may even be desirable for certain applications.

TABLE I

Effect of the IA/HA(M)A Combination

| Composition Number | 1* | 2* | 3 | 4 | 5 |
|---|---|---|---|---|---|
| Monomers: | | | | | |
| But | 67 | 67 | 67 | 67 | 67 |
| Sty | 33 | 33 | 33 | 33 | 33 |
| IA | 2 | — | 2 | 1 | 2 |
| Ha(M)A: | | | | | |
| HEA | — | 5 | 5 | 5 | — |
| HPA | — | — | — | — | 5 |
| CTA: | | | | | |
| CCl$_4$ | 3 | 3 | 3 | 3 | 3 |
| t-DDM | 2 | 2 | 2 | 1 | 1 |
| Particle size (Micrometers) | 0.11 | 0.11 | 0.11 | 0.16 | 0.16 |
| Properties | | | | | |
| 30% Tackifier | | | | | |
| Tack | 9 | 7 | 10 | 12 | 9 |
| Shear | 87 | 57 | 600 | >6000 | 540 |
| 40% Tackifier | | | | | |
| Tack | 9 | 8 | 15 | 14 | 7.5 |
| Shear | 16 | 7 | 318 | 500 | 55 |
| 50% Tackifier | | | | | |
| Tack | 11 | 11 | 17 | 11 | 7 |
| Shear | 13 | 7 | 160 | 80 | 40 |

*Comparative Example, not an example of the present invention.

TABLE II

Effect of the IA Level

| Composition Number | 6* | 7 | 4 | 8 | 9 |
|---|---|---|---|---|---|
| Monomers | | | | | |
| But | 67 | 67 | 67 | 67 | 67 |
| Sty | 33 | 33 | 33 | 33 | 33 |
| IA | 0 | 0.5 | 1 | 2 | 5 |
| HEA | 5 | 5 | 5 | 5 | 5 |
| CTA: | | | | | |
| CCl$_4$ | 3 | 3 | 3 | 3 | 3 |
| t-DDM | 1 | 1 | 1 | 1 | 1 |
| Particle size | 0.16 | 0.16 | 0.16 | 0.16 | 0.16 |
| Properties | | | | | |
| 30% Tackifier | | | | | |
| Tack | 9 | 8 | 12 | >20 | >20 |
| Shear | 6 | 35 | >6000 | 18a | 10a |
| 40% Tackifier | | | | | |
| Tack | 7 | 7.5 | 14 | >20 | >20 |

TABLE II-continued

Effect of the IA Level

| Composition Number | 6* | 7 | 4 | 8 | 9 |
|---|---|---|---|---|---|
| Shear | 4.5 | 17 | 500 | 33a | 50a |
| 50% Tackifier | | | | | |
| Tack | 7 | 7.5 | 11 | >20 | >20 |
| Shear | 3.5 | 6.5 | 80 | 25 | 36a |

*Comparative Example, not an example of the present invention.
aDenotes adhesive failure in shear test.

TABLE III

Effect of the Acid Type

| Composition Number | 4 | 10* | 11* | 12 |
|---|---|---|---|---|
| Monomers: | | | | |
| But | 67 | 67 | 67 | 67 |
| Sty | 33 | 33 | 33 | 33 |
| Acid | | | | |
| IA | 1 | — | — | — |
| AA | — | 1 | — | — |
| MAA | — | — | 1 | — |
| FA | — | — | — | 2 |
| HEA | 5 | 4 | 5 | 5 |
| CTA: | | | | |
| CCl4 | 3 | 3 | 3 | 3 |
| t-DDM | 1 | 1 | 1 | 1 |
| Particle size | 0.16 | 0.16 | 0.16 | 0.16 |
| Properties | | | | |
| 30% Tackifier | | | | |
| Tack | 12 | 11.5 | 9 | >20 |
| Shear | >6000 | 11 | 35 | 49 |
| 40% Tackifier | | | | |
| Tack | 14 | 18 | 9 | >20 |
| Shear | 500 | 8 | 21 | 19 |
| 50% Tackifier | | | | |
| Tack | 11 | >20 | 9 | >20 |
| Shear | 80 | 6.5 | 8 | 5 |

*Comparative Example, not an example of the present invention.

TABLE IV

Effect of the HEA Level

| Composition Number | 13* | 14 | 4 | 15 | 16 |
|---|---|---|---|---|---|
| Monomers: | | | | | |
| But | 67 | 67 | 67 | 67 | 67 |
| Sty | 33 | 33 | 33 | 33 | 33 |
| IA | 1 | 1 | 1 | 1 | 1 |
| HEA | 0 | 1 | 5 | 10 | 15 |
| CTA | | | | | |

TABLE IV-continued

Effect of the HEA Level

| Composition Number | 13* | 14 | 4 | 15 | 16 |
|---|---|---|---|---|---|
| CCl4 | 3 | 3 | 3 | 3 | 3 |
| t-DDM | 1 | 1 | 1 | 1 | 1 |
| Particle size | 0.16 | 0.16 | 0.16 | 0.16 | 0.16 |
| Properties | | | | | |
| 30% Tackifier | | | | | |
| Tack | 9 | 11 | 12 | >20 | >20 |
| Shear | 17 | 47 | >6000 | 40 | 21a |
| 40% Tackifier | | | | | |
| Tack | 9 | 13.5 | 14 | >20 | >20 |
| Shear | 9.5 | 37 | 500 | 28 | 26 |
| 50% Tackifier | | | | | |
| Tack | 10 | 11 | 11 | >20 | >20 |
| Shear | 8 | 7 | 80 | 16 | 11 |

*Comparative Example, not an example of the present invention.
aDenotes adhesive failure in shear test.

What is claimed is:

1. An improved pressure sensitive adhesive polymer consisting essentially of:(a) 1 to 50 parts by weight of at least one monovinylidene aromatic monomer and (b) 50 to 99 parts by weight of at least one conjugated diene monomer on the basis of 100 weight parts (a) and (b) characterized by comprising polymerized therein based on the total amount of adhesive polymer (c) 0.5 to 5 percent by weight itaconic acid and (d) 1.5 to 17 percent by weight of at least one hydroxyalkyl (meth)acrylate.

2. The polymer according to claim 1 wherein the hydroxyalkyl (meth)acrylate is represented by the formula:

$$CH_2=C(R_6)-C(O)-O-R_7-OH$$

wherein $R_6$ is —H or methyl radical and $R^7$ is a straight or branched chain hydrocarbon radical having 1 to 10 carbon atoms.

3. The polymer according to claim 1 wherein the hydroxyalkyl (meth)acrylate is hydroxyethyl acrylate (HEA).

4. The polymer according to claim 1 comprising (a) 10 to 50 parts by weight styrene and (b) 50 to 90 parts by weight butadiene.

5. The polymer according to claim 1 comprising 1 to 3 percent by weight itaconic acid.

6. The polymer according to claim 1 blended with a tackifier.

7. An article coated with the polymer composition according to claim 1.

8. A tape, label or film coated with the polymer composition according to claim 1.

* * * * *